United States Patent [19]
Mankowsky

[11] 3,749,433
[45] July 31, 1973

[54] LOCK NUT ASSEMBLIES
[76] Inventor: Vincent J. Mankowsky, 3037 S. Kensington, Westchester, Ill. 60153
[22] Filed: Oct. 20, 1971
[21] Appl. No.: 190,793

[52] U.S. Cl. ......... 287/189.36 F, 85/32.1, 151/2 R, 151/69
[51] Int. Cl. ............................................. F16b 5/02
[58] Field of Search ............... 151/69, 41.76, 41.7, 151/2 R; 85/35, 32.1, 1, 32 K; 287/189.36 F

[56] References Cited
UNITED STATES PATENTS

| | | |
|---|---|---|
| 2,091,374 | 8/1937 | Pease ............................... 151/41.7 |
| 2,171,385 | 8/1939 | Zeidler ................................ 85/32 K |
| 2,452,227 | 10/1948 | Dahlstrand ................. 287/189.36 F |
| 3,216,540 | 11/1965 | Blinn ......................... 287/189.36 F |
| 932,395 | 8/1909 | Kenney ................................ 85/1 R |

*Primary Examiner*—Edward C. Allen
*Attorney*—Johnston, Root et al.

[57] ABSTRACT

A lock nut assembly having a nut abuttingly engageable with a stationary member, and a clamping member securable to the stationary member in position to clamp the nut in such abutting engagement with the stationary member. When the assembly is applied to both of the threaded ends of a tie rod it effectively prevents rotation or twisting of the tie rod.

5 Claims, 4 Drawing Figures

PATENTED JUL 31 1973 3,749,433

INVENTOR:
VINCENT J. MANKOWSKY
BY
Johnston, Root, O'Keeffe, Keil, Thompson & Shurtleff
ATT'YS

LOCK NUT ASSEMBLIES

BACKGROUND OF THE INVENTION

This invention relates to lock nut assemblies and, more particularly, to lock nut assemblies which are particularly well adapted for use on threaded members held in tension in supporting members.

It is a primary object of the present invention to afford a novel lock nut assembly.

Another object is to afford a novel lock nut assembly which is particularly well adapted for use on tie rods, and the like.

Lock nuts have been heretofore known in the art. However, the lock nuts heretofore known commonly have had several inherent disadvantages, such as, for example, not being reliable in operation; limiting the choice of positions of the nut; being difficult to assemble; being complicated in construction or operation; or being difficult or expensive to manufacture, and the like. It is an important object of the present invention to overcome such disadvantages.

Another object of the present invention is to afford a novel lock nut assembly for holding a nut stationary on an externally threaded member with which it is threadedly engaged.

Yet another object of the present invention is to afford a novel lock nut assembly for use on an externally threaded member mounted in a supporting member.

An object ancillary to the foregoing is to afford a novel lock nut assembly which is effective to clamp the nut portion thereof to a supporting member in a novel and expeditious manner.

A further object of the present invention is to afford a novel lock nut assembly embodying a nut and a clamping member constituted and arranged in a novel and expeditious manner.

Still another object is to prevent rotation or twisting of a tie rod by applying the novel lock nut assembly to both ends of a tie rod where said both ends are threaded in the same direction, whereby any tendency of the rod to rotate will cause one or the other of the assemblies to tighten itself against the end of the tie rod, and thus prevent any rotation.

Another object of the present invention is to afford a novel lock nut assembly which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE EMBODIMENT SHOWN HEREIN

Figures 1, 2, 3, 4:
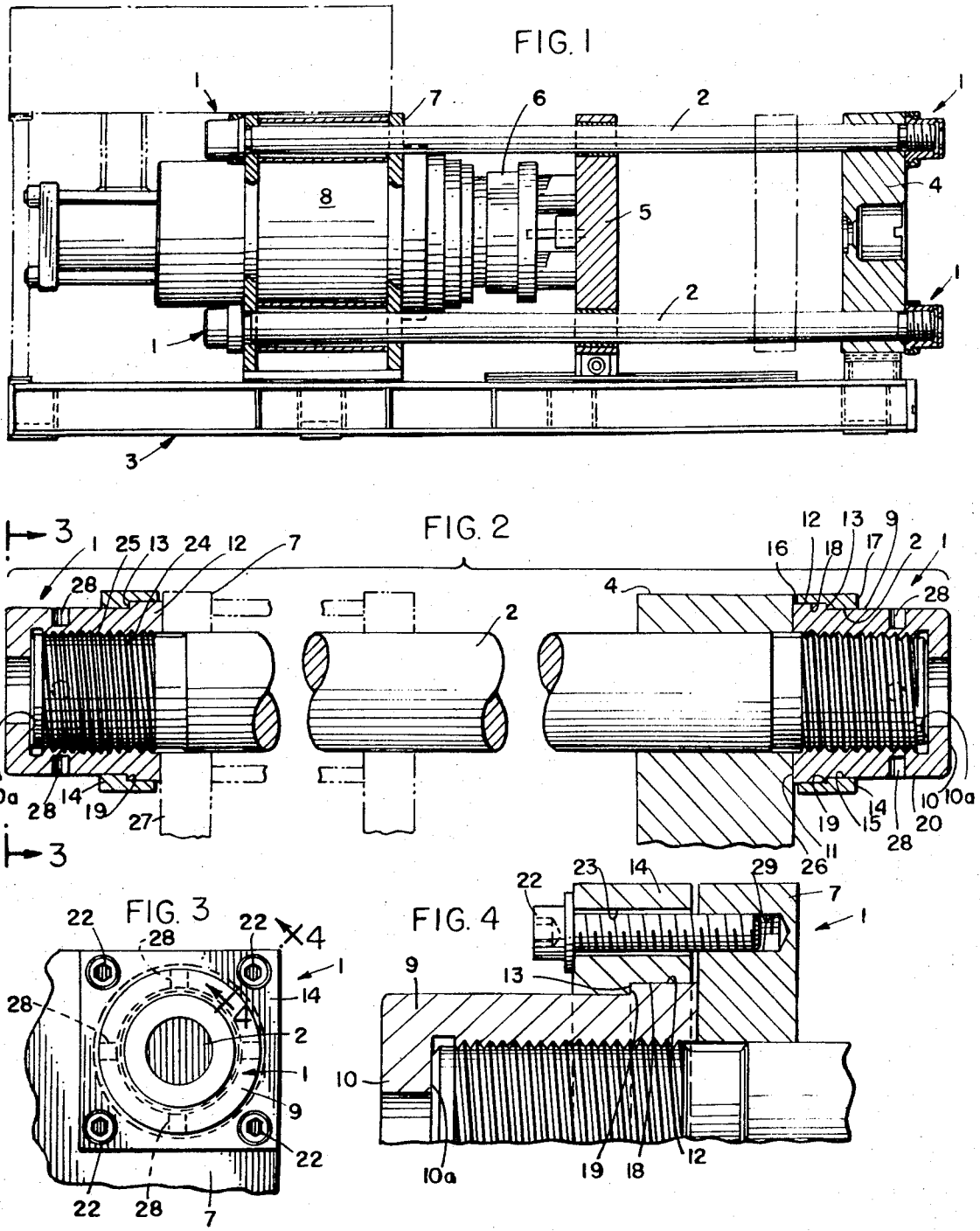
FIG. 1 is a fragmentary sectional view of an injection molding machine embodying lock nut assemblies embodying the principles of the present invention.
FIG. 2 is an enlarged, fragmentary, detail sectional view of a portion of the machine shown in FIG. 1.
FIG. 3 is a fragmentary, detail end elevational view, looking in the direction of the arrows 3—3 in FIG. 2.
FIG. 4 is a fragmentary, detail sectional view taken substantially along the line 4—4 in FIG. 3.

Lock nut assemblies 1, all of which are identical in construction, and which embody the principles of the present invention, are shown in the drawings to illustrate the presently preferred embodiment of the present invention.

The lock nut assemblies 1 are shown in the drawings mounted on the ends of tie rods 2 embodied in an injection molding machine 3. The machine 3 embodies a fixed platen 4, and a movable platen 5, the platen 5 being movable toward and away from the fixed platen 4 by a hydraulically actuated ram 6. The tie rods 2 extend the length of the machine 3 and are secured at their ends to rigid parts of the machine 3, such as the aforementioned platen 4 and the stationary supporting structure or crown 7, which supports a hydraulic cylinder 8, from which the ram 6 projects. One of the lock nut assemblies 1 is mounted on each end of each of the tie rods 2.

As will be appreciated by those skilled in the art, the injection molding machine 3 and the tie rods 2 are shown herein merely by way of illustration and not by way of limitation, and the lock nut assemblies 1 may be used in structures other than injection molding machines, and on members other than tie rods, without departing from the purview of the broader aspects of the present invention.

Each of the lock nut assemblies 1 embodies a nut 9 which has two ends 10 and 11. Each nut 9, preferably, is substantially round in transverse cross section throughout its length and embodies an annular, outwardly projecting enlarged portion 12 adjacent the end 11 thereof, the enlarged portion 12 affording an outwardly projecting, annular shoulder 13 facing toward the end 10, FIGS. 2 and 3. The end 10 of each nut 9 has an internally extending flange thereby providing an inner face 10a.

Each of the lock nut assemblies 1 also embodies a clamping member 14, which, in the preferred form of the present invention comprises a substantially flat plate having an opening 15 extending between the two oppositely disposed side faces 16 and 17 thereof. The portion of the opening 15 adjacent to the face 16 has an enlarged portion or recess 18 therein which affords an inwardly projecting annular shoulder 19 at the portion of the recess 18 remote from the face 16 of the clamping member 14, FIGS. 2 and 4.

The nut 1 preferably is of uniform cross sectional size between the shoulder 13 and the end 10 thereof, and, likewise, the enlarged portion 12 preferably is of uniform cross sectional size throughout the length thereof. The portion 21 of the opening 15 in the clamping member 14, between the shoulder 19 and the face 17 preferably is of such cross sectional size that it will fit on the portion 20 of the nut 9 with a relatively snug, but freely slidable fit; and the enlarged portion 18 of the opening 15 preferably is of such cross sectional size that it will fit on the enlarged portion 12 of the nut 9 with a relative snug, but freely slidable fit. With this construction of the nut 9 and the clamping member 14, the shoulders 13 and 19 are complementary in size and shape and are so disposed on the nut 9 and the clamping member 14, respectively, that when the clamping member 14 is disposed around the nut 9 at its furthermost position to the right, as viewed in FIG. 4, the shoulders 13 and 19 are disposed in abutting engagement with each other. Preferably, the enlarged portion 18 of the opening 15 in the clamping member 14 is of such width that when the shoulder 19 is disposed in abutting engagement with the shoulder 13, the face 16 of the clamping member 14 is held thereby inwardly of the end 11 of the nut 9, FIGS. 2 and 4.

The clamping member 14 shown in the drawings is substantially square in shape, FIG. 3, and in the assembled lock nut assembly 1, four elongated holding members, in the form of socket head cap screws or bolts 22 extend through respective ones of the corners of the clamping member 14 outwardly of the nut 9. Openings 23, FIG. 4, are afforded in each of the corners of the clamping member 14 to receive the respective screws or bolts 22.

With this construction of the lock nut assembly 1, it may be operatively mounted on an externally threaded member, such as an end of one of the tie rods 2 projecting outwardly from a supporting member, such as the platen 4 or stationary support 7, with the internal threads 24 of the nut 9 threadedly engaged with the external threads 25 on the end of the elongated member. In so mounting the lock nut assembly 1 on a tie rod 2, the nut 9 may first be threaded onto the tie rod into position wherein the end 11 thereof is disposed in firmly abutting engagement with the adjacent face of the supporting member, such as, for example, the face 26 of the platen 4, or the face 27 of the stationary support 7, as shown in FIG. 2. The threading of the nut 9 onto the end of the elongated member, such as the tie rod 2, may be effected by any suitable means such as, for example, by using a spanner wrench engaged in holes 28 afforded in the outer periphery of the portion 20 of the nut 9. It is also to be noted that the relationship between the length of the nut 9 and the end of the rod having threads 25 thereon, is such that when the end 11 of the nut is in abutting engagement with the adjacent face of the supporting member, the end of the rod will be in abutting engagement with the inner face 10a of the end 10 of the nut 9.

After the nut 9 has thus been disposed on the elongated member 2 in abutting engagement with the adjacent supporting member, the clamping member 14 may be mounted in position on the nut 9 wherein the shoulder 19 thereof is disposed in abutting engagement with the shoulder 13 on the nut 9. In the preferred form of the invention shown in the drawings, threaded openings 29, FIG. 4, are formed in the supporting members 4 and 7 in position to receive each of the respective bolts or screws 22 in the clamping member 14, when the clamping member 14 is disposed in operative position on the nut 9. Thereafter, with the clamping member 14 so disposed on the nut 9, the bolts or screws 22 may be inserted through the respective openings 23 in the clamping member 14 and threaded into position in the respective aligned openings 29 in the supporting member wherein they are effective to hold the clamping member 14 in position to firmly clamp the enlarged portion 12 of the nut 9 between the shoulder 19 in the clamping member 14 and the adjacent face, such as the face 26 or 27 of the supporting member, such as the platen 4 or the stationary support 7, respectively, from which the elongated member 2 projects.

With the clamping member 14 thus disposed on the nut 9 and secured to the adjacent supporting member, the nut 9 is effectively frictionally held against displacement relative to the supporting member and relative to the elongated member 2 on which it is mounted.

With the nut 9 being round in transverse cross section, and with the opening 15 in the clamping member 14 being complementary in size and shape to the portion of the nut 9 on which the clamping member 14 is mounted in the assembled lock nut assembly 1, the nut 9 and the clamping member 14 may be disposed in any desired rotated position relative to each other so that, although the position of the clamping member 14 is fixed relative to the supporting member on which it is disposed, the nut 9 may be rotated into any position necessary to effect the aforementioned engagement thereof with the adjacent face of the supporting member from which it projects, and the simultaneous engagement of the end of the rod 2 with the inner face 10a of the nut 9.

From the foregoing it will be seen that the present invention affords a novel lock nut assembly.

Also, it will be seen that the present invention affords a lock nut assembly which is particularly well adapted for use on tie rods, and the like, which it is desired to hold in tension in stationary relation to supporting members in which they are mounted.

Furthermore, for the lock nut assemblies to function to prevent rotation of the associated tie rod, it is important that the threads 25 on both ends of each rod extend in the same direction, i.e., both right handed or left handed. Thus, as viewed from the left end in FIGS. 1 and 2, any tendency of the rod to twist or rotate counterclockwise will cause the end of the rod to be forced more tightly against the face 10a of the nut 9 and thereby prevent such rotation. Conversely, any tendency for the rod to twist in a clockwise direction will cause the threads on the right end of the rod to force that end of the rod into tighter engagement with the face 10a of the nut 9 at that end and thus prevent such rotation.

Also, it will be seen that the present invention affords a novel lock nut assembly which is practical and efficient in operation and which may be readily and economically produced commercially.

Thus, while I have illustrated and described the preferred embodiment of my invention, it is to be understood that this is capable of variation and modification, and I, therefore, do not wish to be limited to the precise details set forth, but desire to avail myself of such changes and alterations as fall within the purview of the following claims.

I claim:

1. A tie rod and locking nut assembly for tying together two spaced apart rigid support members, comprising
   a. a tie rod threaded at both ends thereof and extending at both ends through openings in said support members,
   b. a nut threadedly engaging each end of said tie rod and in abutting engagement with the adjacent support member,
   c. each said nut having
      1. an inner end portion for engaging said support member and 2. an outer end portion remote from said inner end portion and extending inwardly to provide an inner face d. the length of tie rod extending through each said support member being such that the end of the tie rod will engage said inner face of said nut thereon when the inner end portion of said nut engages said adjacent support member, e. the threads at both ends of said tie rod extending in the same direction, whereby any tendency of said tie rod to twist or rotate will pull the nut on one or the other ends of said tie rod into tighter engagement with the ends of the tie rod and thereby prevent any such twisting or rotation, f. a clamping member having an opening therethrough adapted to receive said nut associated therewith in operative position therein and to permit relative rotation therebetween, g. complementary cooperating shoulders extending outwardly on the inner end of said nut and inwardly from the wall of the opening in said clamping member and in abutting relationship when said nut is in operative position in said opening, and h. means to secure said clamping member to the adjacent supporting member.

2. A lock nut assembly as defined in claim 1, and in which a. said clamping member comprises a substantially flat plate having two oppositely disposed faces, and b. said first mentioned opening extends between said faces.

3. A lock nut assembly as defined in claim 2, and in which a. said nut and said first mentioned opening are substantially round in transverse cross section.

4. A lock nut assembly as defined in claim 1, and in which a. said last named means comprise bolts adapted to be threaded into said supporting member.

5. A tie rod and locking nut assembly for tying together two spaced apart rigid support members comprising a. a tie rod threaded at both ends thereof and extending at both ends through openings in said support members, b. a nut threadedly engaging each end of said tie rod and in abutting engagement with the adjacent support member, c. each said nut having
1. an inner end portion for engaging said support member and
2. an outer end portion remote from said inner end portion and extending inwardly to provide an inner face d. the length of tie rod extending through each said support member being such that the end of the tie rod will engage said inner face of said nut thereon when the inner end portion of said nut engages said adjacent support member, e. the threads at both ends of said tie rod extending in the same direction, whereby any tendency of said tie rod to twist or rotate will pull the nut on one or the other ends of said tie rod into tighter engagement with the ends of the tie rod and thereby prevent any such twisting or rotation, f. a shoulder on each said nut facing outwardly toward the outer end thereof, and g. clamping means abutting against said shoulder and secured to the adjacent supporting member for clamping said nut in place but permitting relative rotation between said nut and clamping means.

* * * * *